United States Patent [19] [11] 4,331,382
Graff [45] May 25, 1982

[54] WIDE-ANGLE MIRROR FOR AUTOMOBILES AND THE LIKE

[75] Inventor: Henry W. Graff, Elgin, Ill.

[73] Assignee: Pathfinder Auto Lamp Company, Niles, Ill.

[21] Appl. No.: 130,077

[22] Filed: Mar. 13, 1980

[51] Int. Cl.³ .............................................. G02B 5/10
[52] U.S. Cl. ..................................... 350/303; 350/293
[58] Field of Search ................................ 350/293, 303

[56] References Cited

U.S. PATENT DOCUMENTS

| | | | |
|---|---|---|---|
| 2,279,751 | 4/1942 | Hensley | 350/303 |
| 3,389,952 | 6/1968 | Tobin, Jr. | 350/303 |
| 3,501,227 | 3/1970 | Landen | 350/303 |
| 3,628,851 | 12/1971 | Robertson | 350/293 |
| 3,764,201 | 10/1973 | Haile | 350/303 |
| 4,012,125 | 3/1977 | Hart | 350/296 |
| 4,029,399 | 6/1977 | Haile | 350/293 |
| 4,223,983 | 9/1980 | Bloom | 350/303 |

FOREIGN PATENT DOCUMENTS

| | | |
|---|---|---|
| 1921076 | 11/1970 | Fed. Rep. of Germany ...... 350/293 |
| 1941895 | 3/1971 | Fed. Rep. of Germany ...... 350/303 |
| 2415270 | 10/1975 | Fed. Rep. of Germany ...... 350/293 |
| 2725952 | 12/1978 | Fed. Rep. of Germany ...... 350/293 |

Primary Examiner—F. L. Evans
Attorney, Agent, or Firm—Lockwood, Dewey, Alex & Cummings

[57] ABSTRACT

Provided is an improved rear view or rear vision mirror for passenger automobiles, vans and like vehicles, exclusive of buses or trucks larger than pick-up trucks, which mirror affords a wide-angle view well beyond the statutory requirement that outside mirrors give a view of the side of the vehicle through a 10° angle beyond such side of the vehicle to the extent that the image covers the so-called "blind spot" beyond the 10° view path. The improved mirror avoids the use of spherical reflective surfaces and consists essentially of a single substantially planar reflective surface and a single contoured reflective surface that is a generally convex cylindrically contoured surface having a radius of curvature within a critical range of values.

4 Claims, 5 Drawing Figures

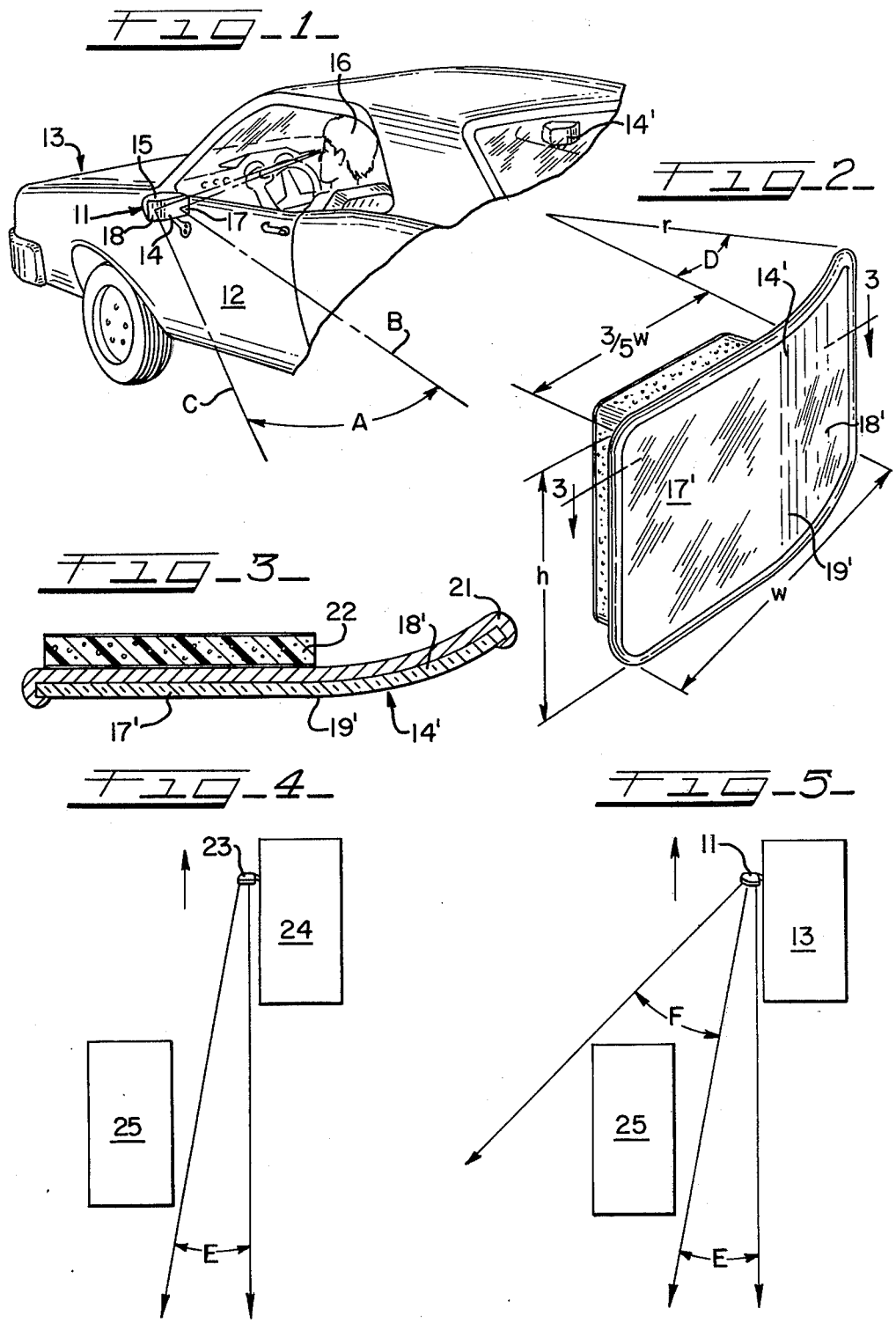

WIDE-ANGLE MIRROR FOR AUTOMOBILES AND THE LIKE

BACKGROUND AND DESCRIPTION OF THE INVENTION

This invention relates generally to mirrors for vehicles, more particularly to rear vision mirrors providing a wide-angle view from either outer side of the vehicle and through the blind spot that is not imaged by conventional rear view mirrors, the mirror itself consisting essentially of a single generally planar reflective surface and a single contoured reflective surface while avoiding the use of any generally spherically shaped reflective surfaces.

Rear vision mirrors that include generally convex reflective areas for providing a reflective view intended to be more extensive than that which can be provided by a flat reflective area are shown for example in U.S. Letters Pat. No. 3,764,201, which discloses a rear vision mirror expressly designed and adapted for large trucks and buses. This patent includes the use of spherical reflective surfaces. The presence of spherical surfaces necessitates, by statute, that a rear view mirror spherical reflective surface have a radius of at least 20 inches in order to preclude image distortion and vehicle operator confusion brought about by a spherical reflective surface having a radius less than 20 inches. Mirrors in compliance with this statutory requirement are exceedingly large and unsuitable for use in smaller vehicles such as passenger automobiles, vans and pick-up trucks having limited side window height and practical limits of how far an outside-mounted mirror can reasonably project beyond the width of these smaller vehicles.

Additionally, U.S. Pat. No. 3,764,201 specifies convex generally cylindrical reflecting zones or areas that curve rearwardly and that have a radius of 5 inches. With the present invention, it has been discovered that a generally convex cylindrical reflecting surface having a radius as small as on the order of 5 inches is not satisfactory because such a small radius creates an unsafe amount of image distortion that all too often leads to driver confusion, especially for non-professional drivers who typically operate passenger automobiles and the like. A radius as small as about 5 inches or less causes a deceiving and very abrupt change in the image seen in the reflective surface, particularly at the junction of the curved reflective surface and an adjacent flat reflective surface.

By the present invention, the disadvantages attendent to using spherically contoured reflective surfaces are avoided, as is the need to use exceptionally large reflective surfaces or the practice of utilizing reflective surfaces having curvature radii smaller than that now found to enhance the safe use of combined curved and planar reflective surfaces, particularly by non-professional drivers. The present invention avoids distortions brought about by spherical surfaces and by curved reflective surfaces having small radii, while at the same time avoiding the need to provide rear vision mirrors having a size that is prohibitive for smaller vehicles such as passenger automobiles and the like.

The present invention provides a wide-angle rear vision mirror that has a single contoured surface which is not spherically contoured and which is integral with and outwardly extending from a single substantially planar reflective surface, wherein the single contoured surface is a convex cylindrically contoured surface having a radius of curvature of approximately 8 inches, plus or minus about 12½ percent.

It is accordingly a general object of the present invention to provide an improved rear vision mirror.

Another object of this invention is an improved rear vision mirror especially structured for mounting outside of either the left side window or the right side window of a vehicle.

Another object of the present invention is an improved rear view or rear vision mirror having a structure that avoids significant image distortion brought about by spherical reflective surfaces and/or contoured surfaces having radii outside of a critical range of radii values.

Another object of the present invention is an improved rear vision mirror for use on relatively small vehicles such as passenger automobiles in order to provide an image at the blind spot area without substantially distorting such image.

Another object of the present invention is an improved rear vision mirror having a single generally planar reflective surface and a single generally cylindrically contoured reflective surface, which surfaces have area measurements related to each other in a predetermined manner.

These and other objects of this invention will become apparent from the following detailed description, taken in conjunction with the accompanying drawings, wherein:

FIG. 1 is a perspective view of a portion of a passenger automobile having a mirror embodying the present invention mounted on both the left-handed side and the right hand-side thereof;

FIG. 2 is a perspective view of the mirror of this invention, shown oriented for mounting on the right-hand side of a vehicle and illustrating the critical dimensional relationships of this invention;

FIG. 3 is a cross-sectional view of the mirrored surface of FIG. 2, shown as adapted for mounting over the planar mirrored surface of a conventional vehicle rear view mirror so as to convert same into a wide-angle rear view mirror;

FIG. 4 is a schematic drawing illustrating the reflected line of sight of a traditional rear view mirror; and FIG. 5 is a schematic drawing illustrating the wide-angle reflecting line of sight achieved by the present invention.

The preferred rear vision mirror in accordance with this invention is illustrated in FIG. 1, being generally designated as 11, shown mounted in known manner on the door 12 of a vehicle 13. Rear vision mirror 11 is depicted in this view as including a composite reflective surface 14 mounted within a streamlined frame 15. When seated within vehicle 13, a driver 16 has a field of vision extending through an angle "A" running from an inner liner of sight "B" reflected from a generally planar reflective surface 17 and through an outer line of sight "C" reflected from a contoured reflective surface 18 whereby the field of vision "A" includes a field of sight generally overlapping into the peripheral vision of the driver 16.

Further details of the composite reflective surface are shown in FIG. 2 illustrating composite reflective surface 14' in which generally planar reflective surface 17' is shown oriented to the left of contoured reflective surface 18' as should be the case when mounted to the right side of the vehicle 13, while in the embodiment shown in FIG. 1 the generally planar reflective surface 17 is illustrated as being oriented to the left of contoured reflective surface 18. Composite reflective surface 14 or 14' has a width "w" and also a height "h" which is substantially less than the width "w". It has been discovered that certain optimum dimensions provide an especially advantageous and safe field of vision, that having a field of vision angle "A" large enough to include the blind spot area and extend into the driver's peripheral vision while minimizing image distortion upon reflectance from contoured reflecting surface 18 or 18' and the unseamed location 19 or 19' where the generally planar reflective surface 17 or 17'; integrally joins the contoured reflective surface 18 or 18'.

Such optimum dimensions call for the width of the generally planar reflective surface 17 to be about 60 percent of the width of composite reflective surface 14, i.e. "3/5 w," while the width of the contoured reflective surface 18 is approximately 40 percent of the composite reflective surface width, i.e. "2/5 w". Additionally, in order to maintain the usefulness of mirror 11 for relatively small vehicles 13 such as passenger automobiles, but while still providing adequate, substantially distortion-free rear vision reflection, the height "h" of the composite reflective surface 14 is approximately the same as the width of the generally planar reflective surface 17, i.e. on the order of about "3/5 w", although height "h" could be as great as "⅔ w", if needed to fit within a conventional frame such as the streamlined automobile frame 15.

With more particular reference to the contoured reflective surface 18, such is a generally convex cylindrically contoured surface having a contour angle "D" of a radius "r". In order to minimize distortion of images while maximizing image size within the confines of an automobile-sized composite reflective surface 14, radius "r" must be about 8 inches in length, plus or minus about 12½ percent of "r".

FIG. 3 is a cross-section through the wide-angle rear vision mirror of FIG. 2 further illustrating the composite reflective surface 14' mounted within a backing frame 21 crimped around the composite reflective surface 14', with an adhesive spacer 22 secured to the backing frame 21 directly behind at least a portion of the generally planar reflective surface 17'. The adhesive spacer 22 and backing frame 21 are provided to enable composite reflective surface 14 to be readily mounted over the flat reflective surface of a conventional rear view mirror when it is not desired to replace the conventional mirror with the entire mirror assembly 11 shown in FIG. 1.

With reference to FIG. 4, this illustrates the line of sight field of vision "E" afforded by a conventional flat surfaced outside rear view mirror 23 mounted upon a moving vehicle 24, such angle being about 10° in size to provide a field of view that excludes a "blind spot" in which another vehicle 25 can be positioned, unknown to the driver of vehicle 24. FIG. 5 illustrates a rear vision mirror 11 in accordance with this invention, such having a reflected line of sight including substantially the same field of vision "E" provided by mirror 23, onto which is added a wide-angle field of vision "F" that is provided by contoured reflective surface 18 (FIGS. 1 and 3), such field of vision "F" including within its angular extent the second vehicle 25, thereby eliminating the "blind spot".

As an example of the preferred interrelationship among the dimensions of the mirror 11, the composite reflective surface would have a width "w" of about 5½ inches and a height "h" of about 3½ inches, whereby the width of the generally planar reflective surface 17 is about 3.3 inches, and the width of the contoured reflective surface 18 is about 2.2 inches.

It will be apparent to those skilled in this art that the present invention can be embodied in various forms; accordingly, this invention is to be construed and limited only by the scope of the appended claims.

I claim:

1. A wide-angle rear vision mirror that has a single contoured surface which is not spherically contoured and that is expressly designed and adapted for use on the right side or left side of passenger automobiles, vans and the like vehicles, comprising a composite reflective surface including:

a single substantially planar reflective surface having a width and a height, said planar surface width being generally equal to said planar surface height;

a single contoured reflective surface having a contoured surface height and a contoured surface width, said single contoured reflective surface being continuous with said planar surface, said single contoured surface being an integral extension of said planar surface in a direction away from the vehicle, said contoured reflective surface being a single generally convex cylindrically contoured surface, said cylindrical contour being that of a right cylinder having a radius of curvature of 8 inches plus or minus about 12½ percent;

said composite reflective surface has a composite width that is substantially identical to the planar surface width plus the contoured surface width;

said composite reflective surface is straight-lined throughout its vertical extent;

said planar surface width is about 3/5 of said composite reflective surface width, and said contoured surface width is about 2/5 of said total reflective surface width;

said composite reflective surface has a composite height identical to said planar surface height and also to said contoured surface height;

said composite reflective surface is unseamed throughout its composite width; and said composite reflective surface has a composite height and a composite width such that the wide angle rear vision mirror overlies substantially the entire surface area of an external automobile rear view mirror.

2. The wide-angle rear vision mirror of claim 1, wherein said composite surface height is between about 3/5 and about ⅔ of said composite reflective surface width.

3. The wide-angle rear vision mirror of claim 1, wherein said composite reflective surface has a back face, and an adhesive-backed spacer is secured to said back face.

4. The wide-angle rear vision mirror of claim 3, wherein said spacer is secured to a location on said back face that is behind at least a portion of the substantially planar reflective surface.

* * * * *

Disclaimer 4,331,382.—*Henry W. Graff*, Elgin, Ill. WIDE-ANGLE MIRROR FOR AUTOMOBILES AND THE LIKE. Patent dated May 25, 1982. Disclaimer filed Mar. 29, 1989, by the assignee, Mr. Gasket Co.

Hereby enters this disclaimer to the entire term of said patent.
[ *Official Gazette June* 6, 1989 ]